United States Patent
Nolterieke et al.

(10) Patent No.: US 9,146,725 B2
(45) Date of Patent: Sep. 29, 2015

(54) PROPAGATING FIRMWARE UPDATES IN A PEER-TO-PEER NETWORK ENVIRONMENT

(75) Inventors: Michael H. Nolterieke, Raleigh, NC (US); William G. Pagan, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 1354 days.

(21) Appl. No.: 12/612,013

(22) Filed: Nov. 4, 2009

(65) Prior Publication Data

US 2011/0106886 A1 May 5, 2011

(51) Int. Cl.
*G06F 15/16* (2006.01)
*G06F 9/445* (2006.01)

(52) U.S. Cl.
CPC .......................................... *G06F 8/65* (2013.01)

(58) Field of Classification Search
CPC ........................................................ G06F 8/65
USPC .......... 709/204, 217, 220, 221; 717/160, 171, 717/173
See application file for complete search history.

(56) References Cited

U.S. PATENT DOCUMENTS

| 6,167,567 | A | 12/2000 | Chiles et al. |
| 6,675,258 | B1 | 1/2004 | Bramhall et al. |
| 6,904,457 | B2* | 6/2005 | Goodman .................... 709/221 |
| 7,032,218 | B2 | 4/2006 | Shirasawa et al. |
| 7,055,148 | B2 | 5/2006 | Marsh et al. |
| 2005/0132359 | A1 | 6/2005 | McGuire et al. |
| 2005/0203851 | A1* | 9/2005 | King et al. ...................... 705/51 |
| 2005/0229173 | A1 | 10/2005 | Mihm et al. |
| 2006/0048144 | A1* | 3/2006 | Willess et al. ................ 717/177 |
| 2006/0225123 | A1* | 10/2006 | Childress et al. ................. 726/1 |
| 2007/0169088 | A1 | 7/2007 | Lambert et al. |
| 2010/0011060 | A1* | 1/2010 | Hilterbrand et al. .......... 709/204 |
| 2010/0306280 | A1* | 12/2010 | Sapek ........................... 707/803 |

OTHER PUBLICATIONS

Mishra, et al.; Distributed Channel Management in Uncoordinated Wireless Environments; Sep. 2006; pp. 170-181; ACM, Los Angeles, CA, USA.

Zhang, et al.; Hardware Design Experiences in ZebraNet; Nov. 2004; pp. 227-238; ACM; Baltimore, MD, USA.

\* cited by examiner

*Primary Examiner* — Brian J Gillis
*Assistant Examiner* — Austin Moreau
(74) *Attorney, Agent, or Firm* — Edward J. Lenart; Katherine S. Brown; Kennedy Lenart Spraggins LLP

(57) ABSTRACT

Propagating firmware updates in a peer-to-peer network including identifying, that one or more nodes in the network have firmware that is uplevel with respect to the downlevel node; broadcasting an update request requesting an update to the firmware; receiving a plurality of portions of the update, metadata describing each portion of the update received, and metadata describing the firmware installed on each of the plurality of nodes having firmware uplevel with respect to the downlevel node; determining, in dependence upon the metadata describing each portion of the update received and the metadata describing the firmware installed on each of the plurality of nodes having firmware uplevel with respect to the downlevel node, whether the portions of the update received comprise an entire update; and updating the firmware if the portions of the update received comprise the entire update.

20 Claims, 5 Drawing Sheets

PROPAGATING FIRMWARE UPDATES IN A PEER-TO-PEER NETWORK ENVIRONMENT

BACKGROUND OF THE INVENTION

1. Field of the Invention

The field of the invention is data processing, or, more specifically, methods, apparatus, and products for propagating firmware updates in a peer-to-peer network environment.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Data centers today often house many computers which are connected in a peer-to-peer network. Often one or more of these computers may have a new version of firmware than one or more other similarly situated computers. One way to update the firmware is to have a systems administrator manually update the firmware of each computer. To manually update the firmware on each computer with each new version release through the use of a systems administrator is burdensome and inefficient.

SUMMARY OF THE INVENTION

Propagating firmware updates in a peer-to-peer network environment including identifying, by a downlevel node in the peer-to-peer network, that one or more nodes in the network have firmware that is uplevel with respect to the downlevel node; broadcasting, by the downlevel node, an update request requesting an update to the firmware; receiving, from a plurality of nodes having firmware uplevel with respect to the downlevel node, a plurality of portions of the update, metadata describing each portion of the update received, and metadata describing the firmware installed on each of the plurality of nodes having firmware uplevel with respect to the downlevel node; determining, in dependence upon the metadata describing each portion of the update received and the metadata describing the firmware installed on each of the plurality of nodes having firmware uplevel with respect to the downlevel node, whether the portions of the update received comprise an entire update; and updating, by the downlevel node, the firmware if the portions of the update received comprise the entire update.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
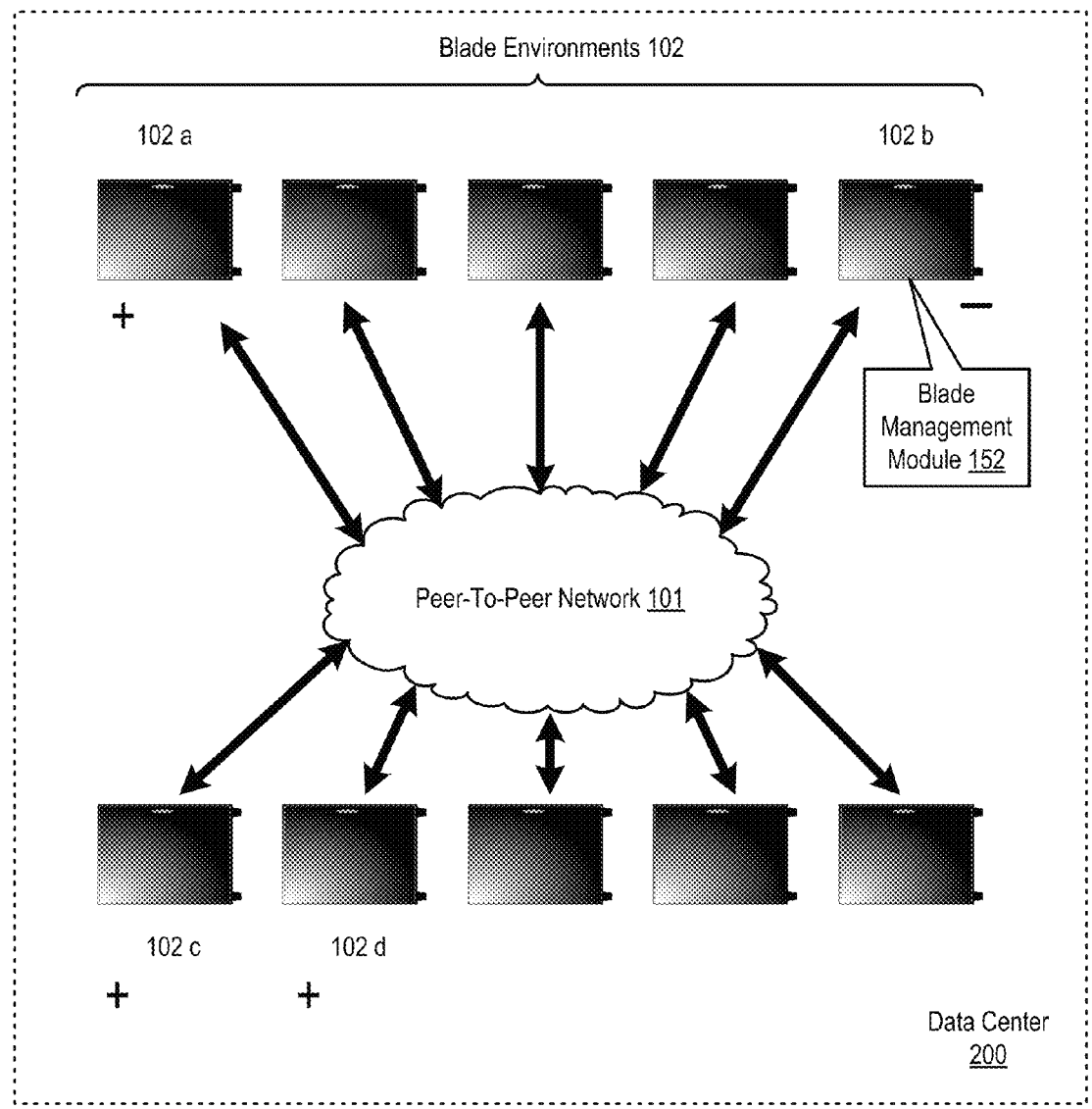
FIG. 1 sets forth a block diagram of a system for propagating firmware updates in a peer-to-peer network environment according to embodiments of the present invention.

Exemplary methods, apparatus, and products for propagating firmware updates in a peer-to-peer network environment in accordance with the present invention are described with reference to the accompanying drawings, beginning with FIG. 1. FIG. 1 sets forth a block diagram of a system for propagating firmware updates in a peer-to-peer network environment according to embodiments of the present invention. The system of FIG. 1 includes a data center (200). A data center is a facility used to house computer systems and associated components, such as telecommunications and storage systems. Data centers generally include redundant or backup power supplies, redundant data communications connections, environmental controls such as air conditioning and security devices and other computers and components as will occur to those of skill in the art.

The data center (200) of FIG. 1 includes a plurality of nodes connected in a peer-to-peer network (101). A node as that term is used in this specification means automated computing machinery capable of supporting firmware that may be propagated according to embodiments of the present invention and capable of data communications with other nodes in a peer-to-peer network. Firmware as that term is used in this specification means software typically contained in read-only memory (ROM).

In the example of FIG. 1, the nodes of the peer-to-peer network are blade environments (102). 'Blade environment,' as the term is used in this specification, refers generally to a blade server system installed in a chassis and including a number of blade servers, one or more blade management modules, a media tray, a blade server system power supply, and other components. One example of a blade environment useful in propagating firmware updates in a peer-to-peer network environment according to embodiments of the present invention is the BladeCenter available from IBM®.

In the example of FIG. 1, each of the blade environments (102) of the data center (200) are connected to a peer-to-peer network (101). A peer-to-peer network architecture is composed of nodes that make a portion of their resources directly available to other network nodes, without the need for central coordination instances such as servers or stable hosts. Nodes in a peer-to-peer network are commonly both suppliers and consumers of resources, in contrast to the traditional client-server model where servers supply and clients consume.

Each of the blade environments (102) in the example of FIG. 1 includes a blade management module (152) capable of propagating firmware updates in a peer-to-peer network environment according to embodiments of the present invention. In the example of FIG. 1, only one blade environment (102b)

is illustrated with a blade management module (152). This is for explanation and not for limitation. Each of the blade environments (102) in the example of FIG. 1 includes a blade management module (152) that supports firmware which may periodically be updated and each of the blade management modules are capable of propagating firmware updates in a peer-to-peer network environment according to embodiments of the present invention.

In the example of FIG. 1, nodes (102b) has installed upon its blade management module (152) firmware which is downlevel with respect to the firmware installed on nodes (102a, 102c, and 102d). The blade management modules of FIG. 1 are capable of propagating firmware updates in a peer-to-peer network environment by identifying, by a downlevel node (102b) in the peer-to-peer network (101), that one or more nodes (102a, 102c, and 102d) in the network have firmware that is uplevel with respect to the downlevel node (102b). The term 'downlevel' in this specification is used to mean a version of the firmware which is older with respect to another version. The term 'uplevel' in this specification is used to mean a more recent version release of the firmware. In the example of FIG. 1, a '−' symbol is used to designate that firmware on the blade management module (152) of blade environment (102b) is downlevel with respect to firmware on the blade management modules of blade environments (102a, 102c, and 102d) designated as uplevel with the '+' symbol. Furthermore, in this specification a node having installed upon it firmware that is downlevel with respect to the firmware installed on one or more other nodes of the network is often called a 'downlevel node.' Similarly, a node having installed upon it firmware which is uplevel with respect to the firmware installed on another node of the network is often called in this specification an 'uplevel node.'

As just mentioned above, the blade management modules of FIG. 1 are capable of propagating firmware updates in a peer-to-peer network environment by identifying, by a downlevel node (102b) in the peer-to-peer network (101), that one or more nodes (102a, 102c, and 102d) in the network have firmware that is uplevel with respect to the downlevel node (102b). The blade management module is capable of identifying that one or more nodes in the network have firmware that is uplevel with respect to the downlevel node by receiving a message broadcast from the node having firmware that is uplevel. Such a message may be broadcast to all nodes on the network upon installation of the uplevel node or periodically nodes may broadcast a message including an identification of the firmware currently installed on the node.

Alternatively, the blade management module of FIG. 1 may periodically broadcast a request for identification of firmware on other nodes in the network and receive, in response to the broadcast, a plurality of identifications of firmware installed on a plurality of other nodes in the network. In still other embodiments, furthermore, the blade management module of FIG. 1 may broadcast a request for identification of firmware on other nodes in the network upon installation in that network and receive, in response to the broadcast, a plurality of identifications of firmware installed on a plurality of other nodes in the network.

In the example of FIG. 1, the downlevel node (102b), implemented as a blade environment, is capable through its management module of broadcasting an update request requesting an update to the firmware and receiving, from a plurality of nodes (102a, 102c, and 102d) having firmware uplevel with respect to the downlevel node (102b), a plurality of portions of the update, metadata describing each portion of the update received, and metadata describing the firmware installed on each of the plurality of nodes having firmware uplevel with respect to the downlevel node. The metadata describing the portion of the update typically identifies information about the portion sent and the metadata describing the firmware installed on the uplevel node typically identifies information about the firmware itself such that the downlevel node may identify whether the entire firmware update has been received from the plurality of uplevel nodes (102a, 102c, and 102d).

In the example of FIG. 1, the downlevel node (102b), implemented as a blade environment, is capable through its management module of determining, in dependence upon the metadata describing each portion of the update received and the metadata describing the firmware installed on each of the plurality of nodes having firmware uplevel with respect to the downlevel node, whether the portions of the update received comprise an entire update and updating the firmware if the portions of the update received comprise the entire update. Updating the firmware if the portions of the update received comprise the entire update may be carried out by installing the received portions of the update on the downlevel node, the blade management module (102) of blade environment (102b) in the example of FIG. 1.

In the example of FIG. 1, the downlevel node (102b), implemented as a blade environment, is capable through its management module of broadcasting again an update request if the portions of the update received do not comprise the entire update. The downlevel node may repeat broadcasting update requests and receiving portions of the update until the portions received comprise an entire update of the firmware.

In the example of FIG. 1, the downlevel node (102b), implemented as a blade environment, is capable through its management module of determining in dependence upon metadata describing the firmware installed on each of the plurality of nodes having firmware uplevel with respect to the downlevel node whether one of the nodes sending a portion of the update has a corrupted image of the uplevel firmware and notifying the nodes having a corrupted image of the uplevel firmware if one of the nodes sending a portion of the update has a corrupted image of the uplevel firmware. The metadata describing the firmware installed on each of the plurality of nodes having firmware uplevel with respect to the downlevel node may include a checksum of the entire firmware. All the checksums of all the uplevel firmware which are identical should be the same. A downlevel node may compare such received checksums and identify a checksum that does not match the majority of the other checksums of uncorrupted firmware. The downlevel node may then notify the node sending the portion of the update with the checksum indicating that the firmware on that node is corrupted.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Exemplary methods, apparatuses, and products for propagating firmware updates in a peer-to-peer network environment are described for example with referent to blade environments. For further explanation, FIG. 2 sets forth a block diagram of an exemplary blade environment (102) useful in propagating firmware updates in a peer-to-peer network environment according to embodiments of the present invention. In this example, the blade environment includes a two-bay chassis (104, 106), a number of blade servers (124), one or more blade management modules (152), a media tray (122), fans (155) and a blade server system power supply (132).

The blade management module (152) is a small computer in its own right, including software and hardware components, one or more computer processors and computer memory, that provide system management functions for all components in the example blade environment (102) including the blade servers (124) and the media tray (122). The blade management module of FIG. 1 also makes available connections for user input devices such as mice or keyboards (181) that are not generally connected directly to the blade servers or to the blade environment chassis. The blade servers themselves (124), installed in cabinet bay (104) of the exemplary blade environment (102) in the example of FIG. 1, are several computing devices implemented in blade form factor. The blade servers share access to the media tray (122). The blade servers (124) are connected to one another and to the blade management module (152) for data communications through a local area network ('LAN')(191). The LAN (191) is a small network installed within the chassis of the blade environment.

The media tray (122) houses non-volatile memory media generally. A media tray may typically include Compact Disc read-only media drives (CD-ROM), Digital Video Disc ROM drives (DVD-ROM), CD-RW drives, DVD-RW drives, floppy disk drives, and so on as will occur those of skill in the art.

Figure 2:
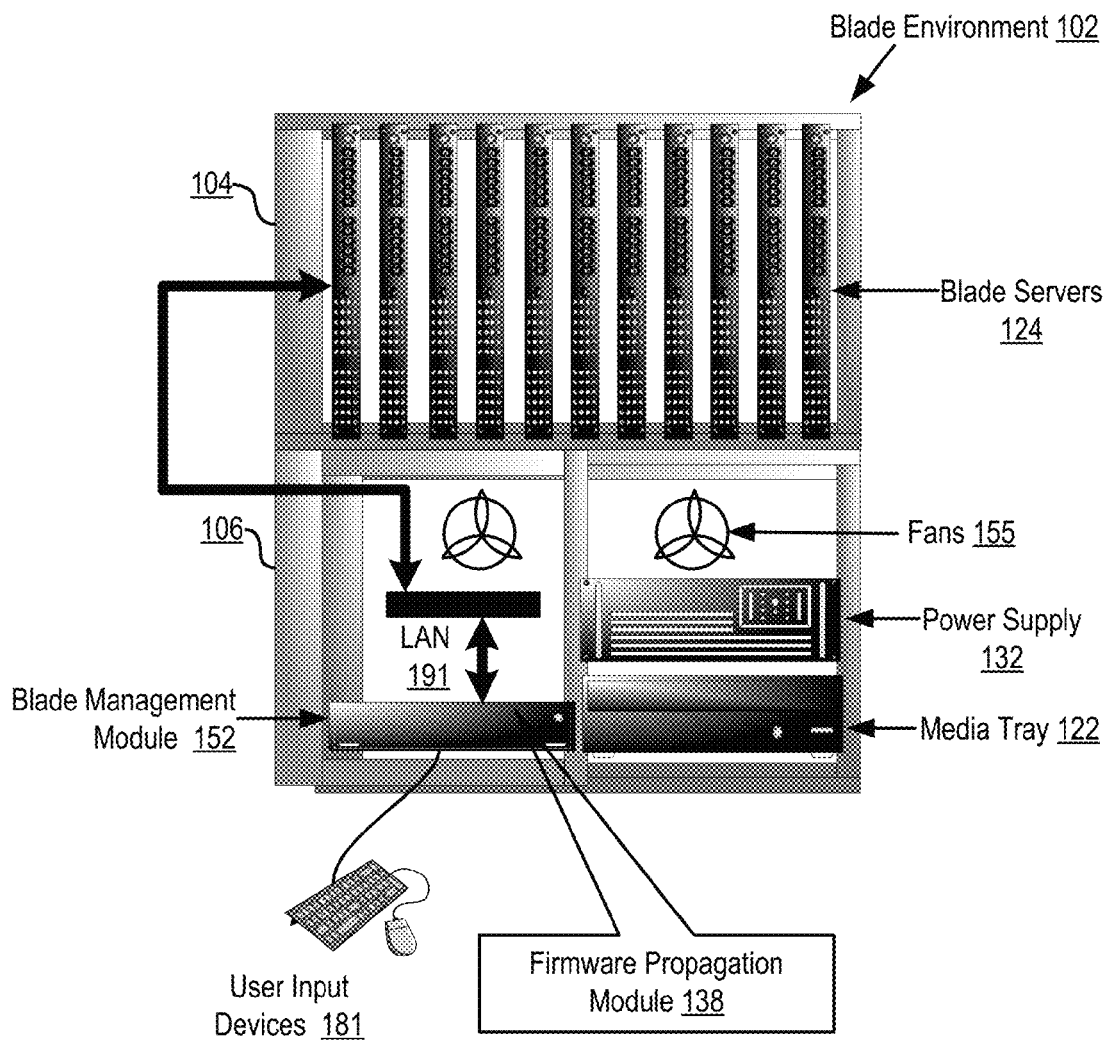
FIG. 2 sets forth a block diagram of an exemplary blade environment useful in propagating firmware updates in a peer-to-peer network environment according to embodiments of the present invention.

Each of the blade servers (124) is cooled by one of the two fans (155) in the example of FIG. 2. The depiction of two fans in the example of FIG. 1 is for explanation and not for limitation. In fact, blade environments useful in propagating firmware updates in a peer-to-peer network environment may include any number of fans as will occur to those of skill in the art.

In the example of FIG. 2, the blade management module (152) has installed upon it a firmware propagation module (138), a module of automated computing machinery capable of propagating firmware updates in a peer-to-peer network environment according to embodiments of the present invention. The firmware propagation module (138) of FIG. 2 includes computer program instructions for identifying, by a downlevel node in the peer-to-peer network, that one or more nodes in the network have firmware that is uplevel with respect to the downlevel node; broadcasting, by the downlevel node, an update request requesting an update to the firmware; receiving, from a plurality of nodes having firmware uplevel with respect to the downlevel node, a plurality of portions of the update, metadata describing each portion of the update received, and metadata describing the firmware installed on each of the plurality of nodes having firmware uplevel with respect to the downlevel node; and determining, in dependence upon the metadata describing each portion of the update received and the metadata describing the firmware installed on each of the plurality of nodes having firmware uplevel with respect to the downlevel node, whether the portions of the update received comprise an entire update; and updating, by the downlevel node, the firmware if the portions of the update received comprise the entire update. The firmware propagation module (138) of FIG. 2 also includes computer program instructions for broadcasting again, by the downlevel node, again an update request if the portions of the update received do not comprise the entire update.

The firmware propagation module (138) of FIG. 2 also includes computer program instructions for determining, by the downlevel node in dependence upon metadata describing the firmware installed on each of the plurality of nodes having firmware uplevel with respect to the downlevel node whether one of the nodes sending a portion of the update has a corrupted image of the uplevel firmware; and notifying, by the downlevel node, the nodes having a corrupted image of the uplevel firmware if one of the nodes sending a portion of the update has a corrupted image of the uplevel firmware.

The arrangement of the blade environment (102), local area network (191), and other devices making up the exemplary system illustrated in FIG. 2 are for explanation, not for limitation. Data processing systems useful according to various embodiments of the present invention may include additional servers, routers, and other devices, not shown in FIG. 2, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 2.

Figure 3:
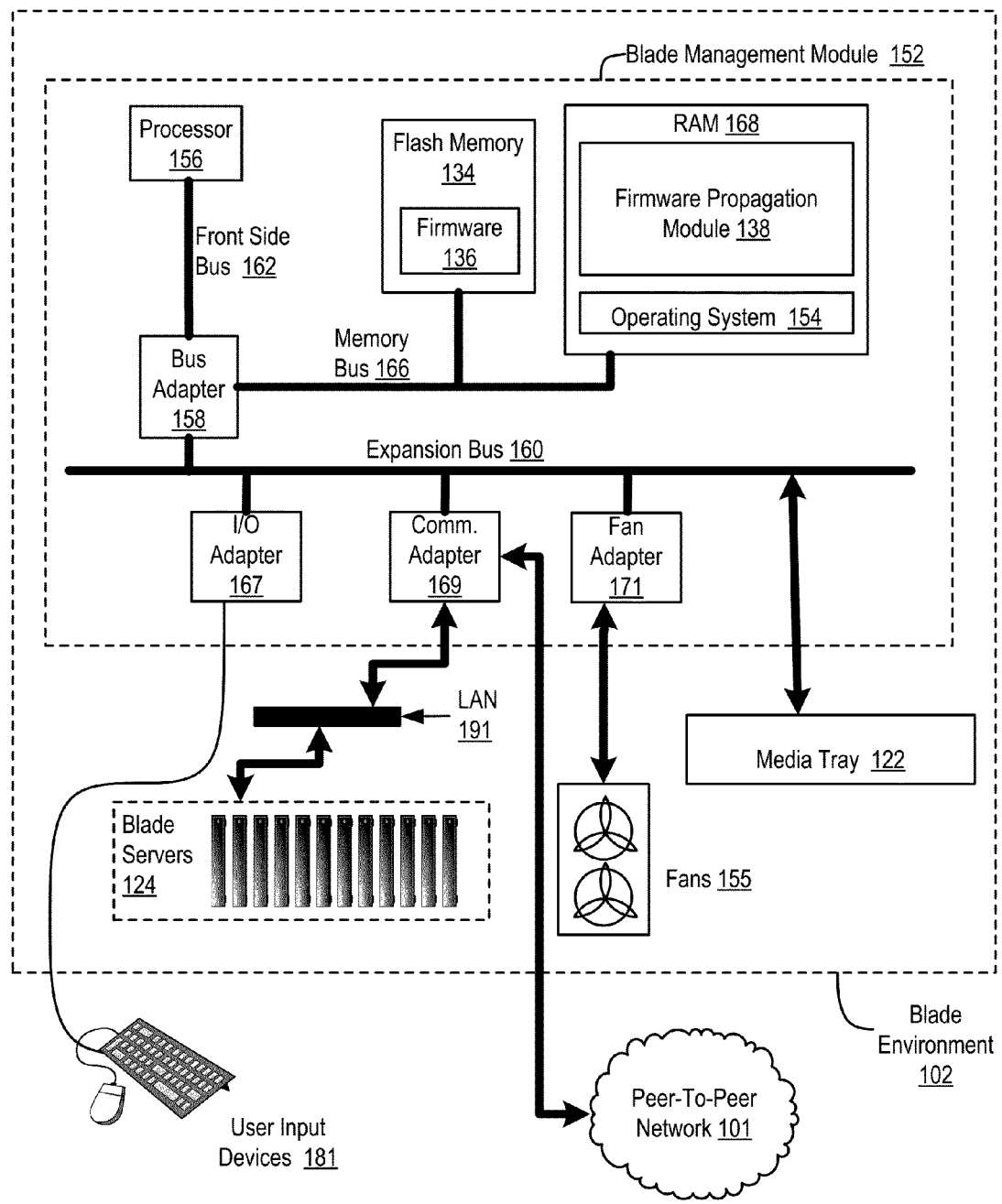
FIG. 3 sets forth a diagram of a further example data processing system useful in propagating firmware updates in a peer-to-peer network environment according to embodiments of the present invention.

For further explanation, FIG. 3 sets forth a diagram of a further example data processing system useful in propagating firmware updates in a peer-to-peer network environment according to embodiments of the present invention. The example data processing system of FIG. 3 is similar to the example of FIG. 2, including as it does a blade environment (102), blade servers (124) connected through an internal LAN (191) to a blade management module (152), fans (155), a fan adapter (171), a media tray (122) connected to the blade management module. In addition, however, by contrast with FIG. 2, FIG. 3 also includes a functional block diagram showing more detail of the blade management module (152). The blade management module (152) of FIG. 3 includes at least one computer processor (156) or 'CPU' as well as random access memory (168) (RAM') which is connected through a high speed memory bus (166) and bus adapter (158) to processor (156) via a front side bus (162) and to other components of the blade management module (152).

Stored in RAM in this example is a firmware propagation module (138), a module of automated computing machinery capable of propagating firmware updates in a peer-to-peer network environment according to embodiments of the present invention. The firmware propagation module (138) of FIG. 3 includes computer program instructions for identifying, by a downlevel node in the peer-to-peer network, that one or more nodes in the network have firmware that is uplevel with respect to the downlevel node; broadcasting, by the downlevel node, an update request requesting an update to the firmware; receiving, from a plurality of nodes having firmware uplevel with respect to the downlevel node, a plurality of portions of the update, metadata describing each portion of the update received, and metadata describing the firmware installed on each of the plurality of nodes having firmware uplevel with respect to the downlevel node; and determining, in dependence upon the metadata describing each portion of the update received and the metadata describing the firmware installed on each of the plurality of nodes having firmware uplevel with respect to the downlevel node, whether the portions of the update received comprise an entire update; and updating, by the downlevel node, the firmware if the portions of the update received comprise the entire update. The firmware propagation module (138) of FIG. 3 also includes computer program instructions for broadcasting again, by the downlevel node, again an update request if the portions of the update received do not comprise the entire update.

The firmware propagation module (138) of FIG. 3 also includes computer program instructions for determining, by the downlevel node in dependence upon metadata describing the firmware installed on each of the plurality of nodes having firmware uplevel with respect to the downlevel node whether one of the nodes sending a portion of the update has a corrupted image of the uplevel firmware; and notifying, by the downlevel node, the nodes having a corrupted image of the uplevel firmware if one of the nodes sending a portion of the update has a corrupted image of the uplevel firmware.

The firmware propagation module (138) in the example of FIG. 3 is shown in RAM. This is for explanation and not for limitation. Alternatively, a firmware propagation module according to embodiments of the present invention may be implemented in hardware or using a combination of hardware and software.

Also stored in RAM (168) is an operating system (154). Operating systems useful according to embodiments of the present invention include UNIX™, Linux™, Microsoft Windows XP™, Microsoft Vista™, AIX™, IBM's i5/OS™, and others as will occur to those of skill in the art. The operating system (154) and the firmware propagation module in the example of FIG. 3 are shown in RAM (168), but many components of such software typically are stored in non-volatile memory also, such as, for example, on a disk drive or in firmware (136) on an EEPROM drive, here shown as flash memory (134).

The exemplary blade management module (152) of FIG. 3 includes one or more input/output ('I/O') adapters (167) coupled to the bus adapter (158) via an expansion bus (160). I/O adapters implement user-oriented input/output through, for example, software drivers and computer hardware for controlling output to display devices such as computer display screens, as well as user input from user input devices (181) such as keyboards and mice.

The exemplary blade management module (152) of FIG. 3 also includes a communications adapter (169) that couples the blade management module (152) internally within the blade environment (102) for data communications with blade servers (124) through a local area network (191) and externally to the data center management module (200). The local area network (191) may be implemented, for example, as an Internet Protocol ('IP') network or an Ethernet™ network, an I²C network, a System Management Bus ('SMBus'), an Intelligent Platform Management Bus ('IPMB'), for example, and in other ways as will occur to those of skill in the art.

Such a communications adapter (169) are electronic modules that implement the hardware level of data communications through which one computer sends data communications to another computer through a data communications network. Examples of communications adapters useful according to embodiments of the present invention include modems for wired dial-up communications, Ethernet (IEEE 802.3) adapters for wired data communications network communications, and 802.11 adapters for wireless data communications network communications.

The arrangement of the blade management module (152), the blade servers (124), and other devices making up the exemplary system illustrated in FIG. 3 are for explanation, not for limitation. Data processing systems useful according to various embodiments of the present invention for propagating firmware updates in a peer-to-peer network environment according to embodiments of the present invention may include additional servers, routers, and other devices, not shown in FIG. 3, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 3.

Figure 4:
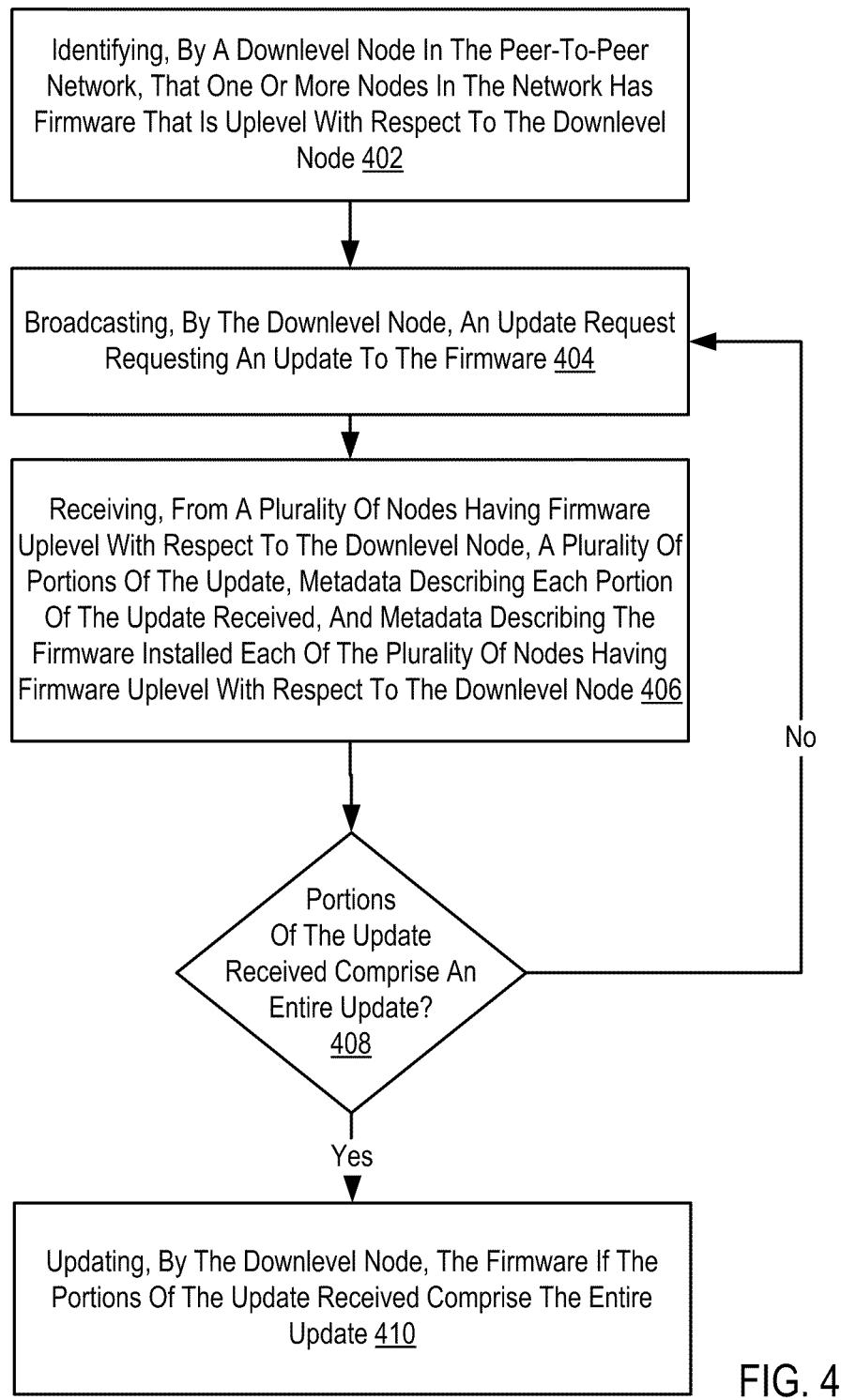
FIG. 4 sets forth a flow chart illustrating an exemplary method of propagating firmware updates in a peer-to-peer network environment according to the present invention.

For further explanation, FIG. 4 sets forth a flow chart illustrating an exemplary method of propagating firmware updates in a peer-to-peer network environment according to the present invention. The method of FIG. 4 includes identifying (402), by a downlevel node in the peer-to-peer network, that one or more nodes in the network have firmware that is uplevel with respect to the downlevel node. Identifying (402), by a downlevel node in the peer-to-peer network, that one or more nodes in the network have firmware that is uplevel with respect to the downlevel node may be carried out by receiving a message broadcast from the node having firmware that is uplevel. Such a message may be received without provocation by the downlevel node. For example, an uplevel node may broadcast a message identifying the version of currently installed firmware on the node upon installation of the node in the peer-to-peer network or upon update of the firmware. Alternatively, each node on the peer-to-peer network may periodically broadcast a message identifying the version of currently installed firmware on that node.

Identifying (402), by a downlevel node in the peer-to-peer network, that one or more nodes in the network have firmware that is uplevel with respect to the downlevel node may also be carried out by periodically broadcasting, by the downlevel node, a request for identification of firmware on other nodes in the network and receiving, in response to the broadcast, a plurality of identifications of firmware installed on a plurality of other nodes in the network. In such embodiments, each node upon its own motion may periodically determine whether it is downlevel with respect to other nodes.

The method of FIG. 4 also includes broadcasting (404), by the downlevel node, an update request requesting an update to the firmware. Broadcasting (404), by the downlevel node, an update request requesting an update to the firmware may be carried out by sending an update request to all the nodes on the peer-to-peer network. Broadcasting (404), by the downlevel node, an update request requesting an update to the firmware may include packetizing the update request and sending the packet with a predetermined broadcast address.

The method of FIG. 4 also includes receiving (406), from a plurality of nodes having firmware uplevel with respect to the downlevel node in response to the broadcast, a plurality of portions of the update, metadata describing each portion of the update received, and metadata describing the firmware installed on each of the plurality of nodes having firmware uplevel with respect to the downlevel node. The nodes having firmware uplevel with respect to the downlevel node may copy a portion of the firmware installed upon the node and send the copy of the portion of the firmware to the downlevel node. In some embodiments, the portion sent may vary from node to node according to a dynamic parameters such as other jobs currently executing on the node, network congestion, size of the firmware, and other factors as will occur to those of skill in the art. In other embodiments, the portion sent may be predetermined for a particular uplevel node, may be a randomly selected portion of a fixed size, a randomly selected portion of a random size, or any other portion of the firmware as will occur to those of skill in the art.

Metadata describing each portion of the update is information describing the portion. Such information may include the size of the portion, the functionality of the firmware included in the portion, a checksum of the portion, or any other metadata describing the portion of the update that will occur to those of skill in the art. Metadata describing the firmware installed on each of the plurality of nodes having firmware uplevel with respect to the downlevel node is information describing the firmware. Such information may include the size of the firmware, a version identification of the firmware, a checksum of the firmware or any other metadata describing the firmware that will occur to those of skill in the art.

The method of FIG. 4 also includes determining (408), in dependence upon the metadata describing each portion of the update received and the metadata describing the firmware installed on each of the plurality of nodes having firmware uplevel with respect to the downlevel node, whether the portions of the update received comprise an entire update. Determining (408) whether the portions of the update received comprise an entire update may be carried out by comparing the received metadata describing each portion of the update received and the received metadata describing the firmware installed on each of the plurality of nodes having firmware uplevel with respect to the downlevel node and identifying whether any portion of the firmware was not received from the uplevel nodes.

The method of FIG. 4 also includes updating (410), by the downlevel node, the firmware if the portions of the update received comprise the entire update. Updating, by the downlevel node, the firmware if the portions of the update received comprise the entire update may be carried out by installing the received portions of the update.

In some cases, in response to a broadcasted update request all of the portions of the update may not be received. The likelihood of this occurring increases as the number of downlevel nodes decreases and as the portions of the update transmitted decreases. The method of FIG. 4 therefore also includes broadcasting (404) again, by the downlevel node, an update request if the portions of the update received do not comprise the entire update. Broadcasting (404) again an update request may be carried out by sending an update request to all of the nodes of the peer-to-peer network that includes an identification of the portions of the update not received in response to the previous broadcast. Broadcasting (404) again an update request may also be carried out by sending the same update request previously broadcast to all of the nodes of the peer-to-peer network that includes an identification of the portions of the update not received in response to the previous broadcast.

As mentioned above, in response to a broadcasted update request, uplevel nodes send metadata describing the firmware currently installed on the uplevel node. For further explanation, therefore, FIG. 5 sets forth a flow chart illustrating an additional exemplary method of propagating firmware updates in a peer-to-peer network environment according to embodiments of the present invention. The method of FIG. 5 is similar to the method of FIG. 4 in that the method of FIG. 5 includes identifying (402), by a downlevel node in the peer-to-peer network, that one or more nodes in the network have firmware that is uplevel with respect to the downlevel node; broadcasting (404), by the downlevel node, an update request requesting an update to the firmware; receiving (406), from a plurality of nodes having firmware uplevel with respect to the downlevel node, a plurality of portions of the update, metadata describing each portion of the update received, and metadata describing the firmware installed on each of the plurality of nodes having firmware uplevel with respect to the downlevel node; determining (408), in dependence upon the metadata describing each portion of the update received and the metadata describing the firmware installed on each of the plurality of nodes having firmware uplevel with respect to the downlevel node, whether the portions of the update received comprise an entire update; and updating (410), by the downlevel node, the firmware if the portions of the update received comprise the entire update.

Figure 5:
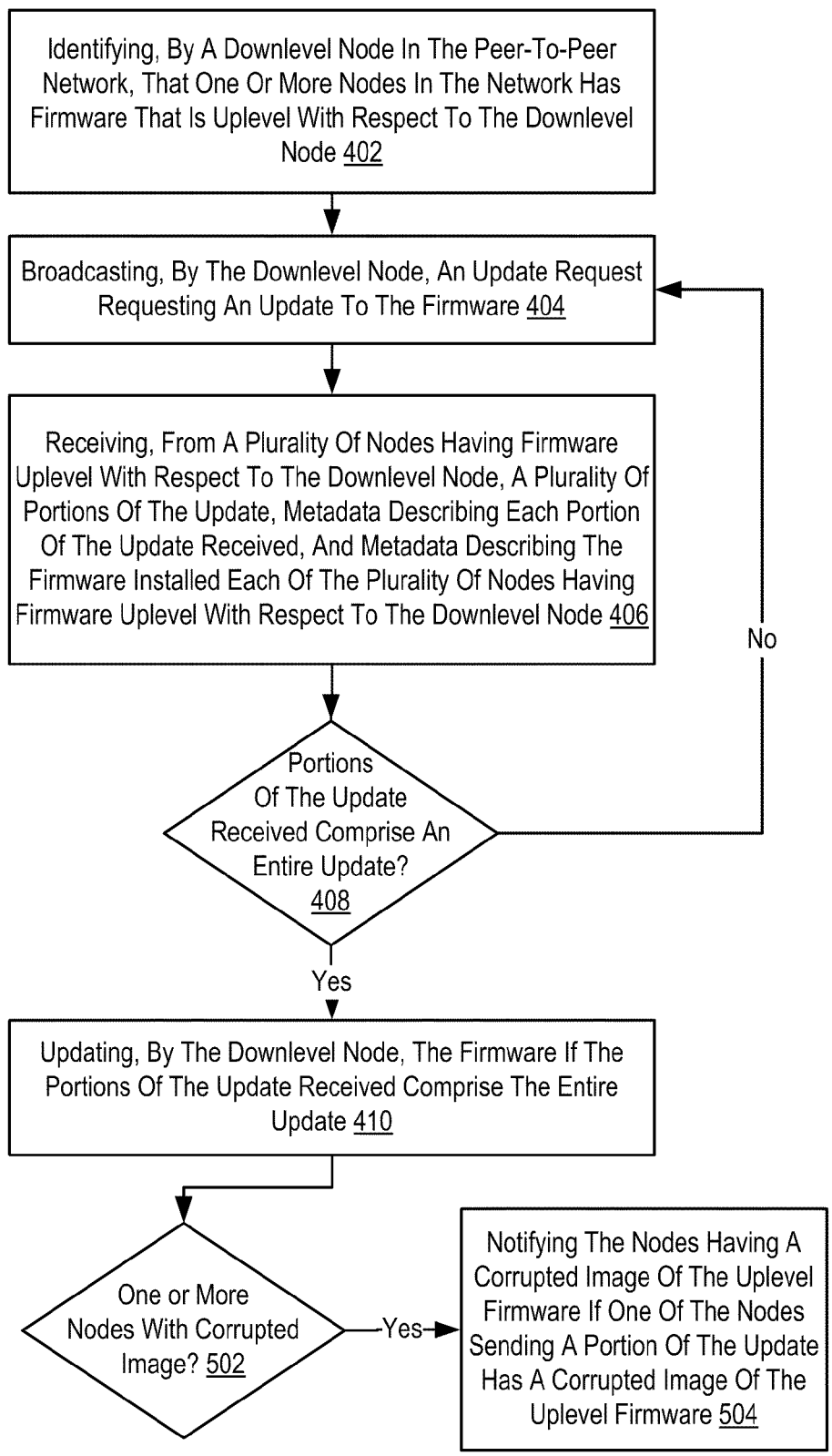
FIG. 5 sets forth a flow chart illustrating an additional exemplary method of propagating firmware updates in a peer-to-peer network environment according to embodiments of the present invention.

The method of FIG. 5 differs from the method of FIG. 4 in that the method of FIG. 5 also include determining (502), by the downlevel node in dependence upon metadata describing the firmware installed on each of the plurality of nodes having firmware uplevel with respect to the downlevel node whether one of the nodes sending a portion of the update has a corrupted image of the uplevel firmware and notifying (504) the nodes having a corrupted image of the uplevel firmware if one of the nodes sending a portion of the update has a corrupted image of the uplevel firmware.

Determining (502), by the downlevel node in dependence upon metadata describing the firmware installed on each of the plurality of nodes having firmware uplevel with respect to the downlevel node whether one of the nodes sending a portion of the update has a corrupted image of the uplevel firmware may be carried out by comparing all the checksums of each firmware image sent by each uplevel node and identifying one or more the checksums do not match other checksums. Typically, the received checksums will be identical for identical images of the firmware. If a checksum is received which does not match the other checksums received, a determination may be made that the firmware image producing the mismatched checksum is corrupted.

The method of FIG. 5 also includes notifying (504) the nodes having a corrupted image of the uplevel firmware if one of the nodes sending a portion of the update has a corrupted image of the uplevel firmware. Notifying (504) the nodes having a corrupted image of the uplevel firmware may be carried out by sending a message to the node informing the node of the corrupted firmware image.

Propagating firmware updates in a peer-to-peer network environment according to embodiments of the present invention has been described largely in the context of data centers and blade server environments. This is for explanation and not for limitation. Propagating firmware updates in a peer-to-peer network environment may be carried out in any peer-to-peer network having nodes that support firmware and require firmware updates as will occur to those of skill in the art.

Exemplary embodiments of the present invention are described largely in the context of a fully functional computer system for propagating firmware updates in a peer-to-peer network environment. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernet™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of propagating firmware updates in a peer-to-peer network environment, the method comprising:
    identifying, by a downlevel node in a peer-to-peer network, that one or more nodes in the peer-to-peer network have firmware that is uplevel with respect to the downlevel node;
    broadcasting, by the downlevel node, an update request requesting an update to the firmware;
    receiving, from a plurality of nodes having firmware uplevel with respect to the downlevel node, a plurality of portions of the update, metadata describing each portion of the update received, and metadata describing the firmware installed on each of the plurality of nodes having firmware uplevel with respect to the downlevel node; and
    determining, in dependence upon the metadata describing each portion of the update received and the metadata describing the firmware installed on each of the plurality of nodes having firmware uplevel with respect to the downlevel node, whether the portions of the update received comprise an entire update; and
    updating, by the downlevel node, the firmware if the portions of the update received comprise the entire update.

2. The method of claim 1 further comprising broadcasting again, by the downlevel node, again an update request if the portions of the update received do not comprise the entire update.

3. The method of claim 2 wherein broadcasting again an update request further comprises sending to all of the nodes of the peer-to-peer network an update request that includes an identification of the portions of the update not received in response to the previous broadcast.

4. The method of claim 1 further comprising determining, by the downlevel node in dependence upon metadata describing the firmware installed on each of the plurality of nodes having firmware uplevel with respect to the downlevel node whether one of the nodes sending a portion of the update has a corrupted image of the uplevel firmware; and
    notifying, by the downlevel node, the nodes having a corrupted image of the uplevel firmware if one of the nodes sending a portion of the update has a corrupted image of the uplevel firmware.

5. The method of claim 1 wherein identifying, by a downlevel node in the peer-to-peer network, that one or more nodes in the peer-to-peer network have firmware that is uplevel with respect to the downlevel node further comprises receiving a message broadcast from the node having firmware that is uplevel.

6. The method of claim 1 wherein identifying, by a downlevel node in the peer-to-peer network, that one or more nodes in the peer-to-peer network have firmware that is uplevel with respect to the downlevel node further comprises:
    periodically broadcasting, by the downlevel node, a request for identification of firmware on other nodes in the peer-to-peer network; and
    receiving, in response to the broadcast, a plurality of identifications of firmware installed on a plurality of other nodes in the peer-to-peer network.

7. The method of claim 1 wherein updating, by the downlevel node, the firmware if the portions of the update received comprise the entire update further comprises installing the received portions of the update.

8. An apparatus for propagating firmware updates in a peer-to-peer network environment, the apparatus comprising a computer processor, a computer memory operatively coupled to the computer processor, the computer memory having disposed within it computer program instructions capable of:
    identifying, by a downlevel node in a peer-to-peer network, that one or more nodes in the peer-to-peer network have firmware that is uplevel with respect to the downlevel node;
    broadcasting, by the downlevel node, an update request requesting an update to the firmware;
    receiving, from a plurality of nodes having firmware uplevel with respect to the downlevel node, a plurality of portions of the update, metadata describing each portion of the update received, and metadata describing the firmware installed on each of the plurality of nodes having firmware uplevel with respect to the downlevel node; and
    determining, in dependence upon the metadata describing each portion of the update received and the metadata describing the firmware installed on each of the plurality of nodes having firmware uplevel with respect to the downlevel node,
    whether the portions of the update received comprise an entire update; and
    updating, by the downlevel node, the firmware if the portions of the update received comprise the entire update.

9. The apparatus of claim 8 wherein the computer memory has disposed within it computer program instructions capable of broadcasting again, by the downlevel node, again an update request if the portions of the update received do not comprise the entire update.

10. The apparatus of claim 9 wherein computer program instructions capable of broadcasting again an update request further comprises computer program instructions capable of sending to all of the nodes of the peer-to-peer network an update request that includes an identification of the portions of the update not received in response to the previous broadcast.

11. The apparatus of claim 8 wherein the computer memory has disposed within it computer program instructions capable of:
    determining, by the downlevel node in dependence upon metadata describing the firmware installed on each of the plurality of nodes having firmware uplevel with respect to the downlevel node whether one of the nodes sending a portion of the update has a corrupted image of the uplevel firmware; and
    notifying, by the downlevel node, the nodes having a corrupted image of the uplevel firmware if one of the nodes sending a portion of the update has a corrupted image of the uplevel firmware.

12. The apparatus of claim 8 wherein computer program instructions capable of identifying, by a downlevel node in the peer-to-peer network, that one or more nodes in the peer-to-peer network have firmware that is uplevel with respect to the downlevel node further comprises computer program instructions capable of receiving a message broadcast from the node having firmware that is uplevel.

13. The apparatus of claim 8 wherein computer program instructions capable of identifying, by a downlevel node in the peer-to-peer network, that one or more nodes in the peer-to-peer network have firmware that is uplevel with respect to the downlevel node further comprises computer program instructions capable of:
    periodically broadcasting, by the downlevel node, a request for identification of firmware on other nodes in the peer-to-peer network; and
    receiving, in response to the broadcast, a plurality of identifications of firmware installed on a plurality of other nodes in the peer-to-peer network.

14. The apparatus of claim 8 wherein computer program instructions capable of updating, by the downlevel node, the firmware if the portions of the update received comprise the entire update further comprises computer program instructions capable of installing the received portions of the update.

15. A non-transitory computer program product for propagating firmware updates in a peer-to-peer network environment, the computer program product disposed in a computer readable recordable medium, the computer program product comprising computer program instructions for:
    identifying, by a downlevel node in a peer-to-peer network, that one or more nodes in the peer-to-peer network have firmware that is uplevel with respect to the downlevel node;
    broadcasting, by the downlevel node, an update request requesting an update to the firmware;
    receiving, from a plurality of nodes having firmware uplevel with respect to the downlevel node, a plurality of portions of the update, metadata describing each portion of the update received, and metadata describing the firmware installed on each of the plurality of nodes having firmware uplevel with respect to the downlevel node; and
    determining, in dependence upon the metadata describing each portion of the update received and the metadata describing the firmware installed on each of the plurality of nodes having firmware uplevel with respect to the downlevel node, whether the portions of the update received comprise an entire update; and updating, by the downlevel node, the firmware if the portions of the update received comprise the entire update.

16. The non-transitory computer program product of claim 15 further comprising computer program instructions for broadcasting again, by the downlevel node, again an update request if the portions of the update received do not comprise the entire update.

17. The non-transitory computer program product of claim 16 wherein computer program instructions for broadcasting again an update request further comprise computer program instructions for sending to all of the nodes of the peer-to-peer network an update request that includes an identification of the portions of the update not received in response to the previous broadcast.

18. The non-transitory computer program product of claim 15 further comprising computer program instructions for determining, by the downlevel node in dependence upon metadata describing the firmware installed on each of the plurality of nodes having firmware uplevel with respect to the downlevel node whether one of the nodes sending a portion of the update has a corrupted image of the uplevel firmware; and
    computer program instructions for notifying, by the downlevel node, the nodes having a corrupted image of the uplevel firmware if one of the nodes sending a portion of the update has a corrupted image of the uplevel firmware.

19. The non-transitory computer program product of claim 15 wherein computer program instructions for identifying, by a downlevel node in the peer-to-peer network, that one or more nodes in the peer-to-peer network have firmware that is uplevel with respect to the downlevel node further comprise computer program instructions for receiving a message broadcast from the node having firmware that is uplevel.

20. The non-transitory computer program product of claim 15 wherein computer program instructions for identifying, by a downlevel node in the peer-to-peer network, that one or more nodes in the peer-to-peer network have firmware that is uplevel with respect to the downlevel node further comprises computer program instructions for:
    periodically broadcasting, by the downlevel node, a request for identification of firmware on other nodes in the peer-to-peer network; and
    receiving, in response to the broadcast, a plurality of identifications of firmware installed on a plurality of other nodes in the peer-to-peer network.

* * * * *